(12) United States Patent
Niemi

(10) Patent No.: US 7,038,701 B2
(45) Date of Patent: May 2, 2006

(54) METHOD FOR ZOOMING

(75) Inventor: Sami Niemi, Lund (SE)

(73) Assignee: Scalado AB, Lund (SE)

( * ) Notice: Subject to any disclaimer, the term of this patent is extended or adjusted under 35 U.S.C. 154(b) by 509 days.

(21) Appl. No.: 09/853,602

(22) Filed: May 14, 2001

(65) Prior Publication Data

US 2002/0105531 A1 Aug. 8, 2002

(30) Foreign Application Priority Data

Feb. 2, 2001 (SE) .............................. 0100325

(51) Int. Cl.
G09G 5/00 (2006.01)

(52) U.S. Cl. .................................... 345/660
(58) Field of Classification Search ................ 345/472, 345/472.2, 660, 671, FOR 150; 348/63, 208.6, 348/240.99, 240.1, 240.2, 240.3, 561, FOR 211, 348/212

See application file for complete search history.

(56) References Cited

U.S. PATENT DOCUMENTS

| 5,341,466 | A |  | 8/1994 | Perlin et al. ................. 395/139 |
|---|---|---|---|---|
| 5,880,856 | A |  | 3/1999 | Ferriere |
| 5,907,640 | A |  | 5/1999 | Delean ........................ 382/276 |
| 6,049,342 | A |  | 4/2000 | Nielsen et al. ............... 345/473 |
| 6,147,709 | A | * | 11/2000 | Martin et al. ................ 348/239 |
| 6,281,874 | B1 | * | 8/2001 | Sivan et al. ................. 345/660 |
| 6,526,234 | B1 | * | 2/2003 | Malloy Desormeaux .... 396/374 |
| 6,600,840 | B1 | * | 7/2003 | McCrossin et al. ......... 382/302 |
| 2003/0033402 | A1 | * | 2/2003 | Battat et al. ................. 709/224 |

FOREIGN PATENT DOCUMENTS

| EP | 0 878 956 A1 | 11/1998 |
|---|---|---|
| GB | 2 343 807 | 5/2000 |

OTHER PUBLICATIONS

Nisha Talagala et al., "The Art of Massive Storage: A Web Image Archive", Computer, pp. 22–28 (Nov. 11, 2000).
Nisha Talagala et al., "Usage Patterns of a Web–Based Image Collection," IEEE Symposium on Mass Storage Systems 1999: 203–214.

* cited by examiner

Primary Examiner—Matthew C. Bella
Assistant Examiner—G. F. Cunningham
(74) Attorney, Agent, or Firm—Finnegan, Henderson, Farabow, Garrett & Dunner, L.L.P.

(57) ABSTRACT

An image is being presented on a display device connected to a storage unit, wherein said presentation image is loaded to the display device from said storage unit and said presentation image comprises at least one preselected, zoomable area. A method for zooming in the image comprises the steps of continuously zooming (26) in on the preselected area in the presentation image and during the step of continuous zooming, loading (28) a detail image information data set to the display device from the storage unit. The detail image information data set is used for presenting the preselected area in higher resolution than the presentation image. The method further comprises the step of improving (30) the resolution of the zoomed-in-on, preselected area in the presentation image on the display device by means of the loaded detail image information data set when the zooming in on the preselected area in the presentation image is complete.

32 Claims, 2 Drawing Sheets

METHOD FOR ZOOMING

TECHNICAL FIELD

The present invention relates to a method for zooming in a digital image that is being presented on a display device and a method and a device for generating an image for electronic presentation.

BACKGROUND OF THE INVENTION

Images contain and consist of a lot of data. It takes a long time to download large images through a network and this causes undesired waiting times. Download of images is often performed when surfing the Internet or when in other ways connected to a network of computers. The waiting times will be considerably longer if using a slow transmission link, such as being connected to the Internet through a modem. These waiting times are so long today that many users will not even bother to try to download a large image when using a slow transmission link.

In order to reduce the waiting times of downloading, it is known to compress the images so that the amount of data that is downloaded is reduced. However, image compression could only be performed up to a certain limit, then image information is being lost. An image that has been compressed sufficiently to allow short downloading times will then not show enough details.

Attempts have been made to solve this problem in several ways. One way is to present a small image, which has been hugely compressed. The user could then choose if he wants to download the original, large image by clicking on the image to get the download. This download takes time but is not forced on the user.

Another method is disclosed by Talagala et al., *Usage Patterns of a Web-Based Image Collection*, IEEE Symposium on Mass Storage Systems 1999: 203–214. According to this method an image is stored in different magnitudes on a server. When a user accesses a web site, the image is first presented in the smallest magnitude and a user could click to zoom in the image. The image is then downloaded in a larger magnitude and presented to the user. If the image size exceeds an image frame in the web site, the area in which the user clicked is presented and the image could be panned to show other parts of it. The image is divided into smaller tiles, which are downloaded in sequence, and so the image is presented bit by bit during downloading.

According to these methods a large image is not presented until the user explicitly asks for it. However, when a user wants to see an image in larger detail, a large image is downloaded causing waiting times. The small tiles, in the method according to Talagala et al., make the downloading time of an individual tile relatively short, but the header of the image file is rather large in order to control where each tile should be presented in the image. The user sees the image being built up bit by bit by the tiles, but has to wait for a while before all tiles have been downloaded.

SUMMARY OF THE INVENTION

The object of the invention is to solve the above-mentioned problem and provide an improved method for zooming in an image. A further object of the invention is that the zooming method should require only small memory capacities and involve no or short waiting times.

The objects of the invention are achieved by a method for zooming in a digital image that is being presented on a display device connected to a storage unit. Said presentation image is loaded to the display device from said storage unit and said presentation image comprises at least one preselected, zoomable area. The method comprises the steps of continuously zooming in on the preselected area in the presentation image, and during the step of continuous zooming, loading a detail image information data set to the display device from the storage unit. Said detail image information data set is used for presenting the preselected area in higher resolution than in the presentation image. The method further comprises the step of improving the resolution of the zoomed-in-on, preselected area in the presentation image on the display device by means of the loaded detail image information data set when the zooming in on the preselected area in the presentation image is complete.

According to the invention, there is no need for loading of extensive images. Only the information that is asked for is loaded. When a zooming occurs, the loading of a detail image information data set implies that only information of the selected area is loaded. This sets a low demand on the amount of data that has to be loaded and the amount of memory occupied in the storage unit as only the interesting parts of the image have to be stored in a high resolution. This also gives a provider of the image the possibility of only allowing zooming in on those parts of the image that the provider wants to show. The focus could thus, for example, be directed at a certain article among other ones in the image that the provider wants to sell.

Furthermore, the waiting times are avoided completely or almost completely, since the loading of the detail image information data set occurs during the continuous zooming in the presentation image. A user will not notice the time passing during the loading of the detail image because of the continuous zoom that is taking place during that time. The continuous zooming is performed in the presentation image and when the zooming is completed the resolution of the zoomed-in-on, preselected area is improved by means of the loaded detail image information data set.

The storage unit could be accessed directly by the display device or through any kind of network connection, such as through a wireless network or through a physically connected network. Thus, the storage unit could be a persistent memory on a device or a server on a network. The zooming could then be used both for images downloaded from a network to the display device or for images that are stored in a restricted, very small memory space, such as in a Personal Digital Assistant, PDA. The detail image information data set comprises information about a detail image in higher resolution of the preselected, zoomable area. The information data set could be stored as a file or a scattered data set on the storage unit.

When the preselected area is zoomed in on, it could be the only part of the presentation image that is presented. Alternatively, parts of the presentation image outside the preselected, zoomed-in-on area could be presented with it.

In a preferred embodiment, the detail image information data set comprises a difference image, said difference image representing the difference between the zoomed-in-on, preselected area in the presentation image and a detail image representing the zoomed-in-on, preselected area in higher resolution.

The difference image is defined as a matrix, in which each element represents the difference in that position between the pixel values of the zoomed-in-on, preselected area and the detail image. This difference image has many values that are zero or close to zero and could thus be heavily compressed, since the detail image and the zoomed-in-on, preselected area are very similar. The difference image could then be very small and loaded in a very short time.

Preferably, the step of improving the resolution comprises the steps of adding the difference image to the zoomed-in-on, preselected area in the presentation image to generate a detail image of the zoomed-in-on, preselected area in higher resolution and replacing the zoomed-in-on, preselected area in the presentation image on the display device by the detail image. As a result, the image quality of the zoomed-in-on, preselected area is easily improved by a simple pixelwise addition of the difference image to the zoomed-in-on, preselected area.

In another embodiment, the detail image information data set comprises a detail image representing the preselected area in higher resolution than the presentation image. Thus, the detail image information data set holds a complete detail image in higher resolution of the zoomed-in-on, preselected area, which detail image is prepared for presentation.

Preferably, the step of improving the resolution comprises the step of replacing the zoomed-in-on, preselected area in the presentation image on the display device with the detail image when the zooming in on the preselected area in the presentation image is complete.

The step of improving the resolution is then performed by simply presenting the loaded detail image over the zoomed-in-on, preselected area.

Preferably, the method further comprises the step of zooming out from a detail image that is being presented on the display device. The step of zooming out comprises the steps of replacing the detail image on the display device by the corresponding completely zoomed-in-on, preselected area in the presentation image, and subsequently continuously zooming out from the corresponding area of the presentation image until the entire presentation image is presented. As a result, the method provides a further possibility of zooming back out to the presentation image. This zooming out is also performed without annoying waiting times as the corresponding area of the presentation image has previously been zoomed in on and thus could be stored in a cache memory of the display device. The detail image could then instantly be replaced and the zooming out is performed continuously so the time for zooming out is not noticed.

In a preferred embodiment, the presentation image is being presented in a window on the display device and the continuous zooming is performed in the same window so that a gradually smaller/greater part of the presentation image is shown in the window during the continuous zooming. The window does not have to be changed in size, which means that other objects that are simultaneously presented on the display device are not affected. Furthermore, the focus of the observer is held on the detail that is being zoomed in on.

In another preferred embodiment, the continuous zooming expands/reduces the preselected area over the presentation image so that the preselected area gradually covers a greater/smaller part of the presentation image. The presentation image is then kept as a background to the zooming operation and the preselected area in the presentation image is expanding to cover a gradually greater part of the presentation image. In this way, there are no problems of matching the proportions of the preselected area to the proportions of the presentation image, as the preselected area could be filling just a part of the presentation image when zoomed in on. Thus, there is no restriction on the form of the part that is filled.

Preferably, the detail image fills the window when replacing the zoomed-in-on, preselected area in the presentation image. This provides that the detail image is presented on the largest possible scale without affecting other objects that are presented on the display device.

Advantageously, the boundaries of the preselected, zoomable areas in the presentation image are indicated in the presentation image to highlight the preselected, zoomable areas. As a result, the areas that can be zoomed in on are marked so that a user can easily see which parts can be zoomed in on. This could also generate a curiosity of the user and thus encourage him to click to get a detail image of the zoomable areas presented.

In a preferred embodiment, a detail image comprises preselected, zoomable areas and zooming in on one of these preselected areas is performed in the same manner as for the presentation image. As a result, several steps of zooming in can be performed in the image that is being presented.

In another preferred embodiment, meta data is associated with at least one of the presentation image and the detail images. This gives a lot of extra possibilities for the presentation of the image. The meta data could include statistics or other information about objects that are being presented. The meta data could then be presented when the image with which the meta data is associated is presented. The meta data could include text information, sounds, videos etc.

Preferably, the meta data comprises search criteria to enable a user to search for a specific detail image. As a result, objects presented in each image could be included in the meta data so that an image could be searched for depending on what is shown in it.

Desirably, a search results in a pointer to a requested detail image. A step of presenting the requested detail image comprises the steps of determining a current image, which is the image that is currently presented on the display device, and determining a common image for the current image and the requested image. The common image is the image of largest scale that includes both an area corresponding to the current image and an area corresponding to the requested image. The step of presenting the requested detail image further comprises the steps of zooming out from the current image to the common image, and zooming in from the common image to the requested image. As a result, a user can be guided to an image that is requested through a search. The user will then get a clear understanding of where the presented detail image is located in a larger perspective.

Preferably, the meta data associated with an image is shown when the image is presented on the display device. Thus, a sound file could be played or a short text with information could be shown when an image is presented. The user will then get more information about the presented image and only the information that is relevant to the presented image is shown.

According to another embodiment, the meta data associated with a detail image is shown when a marker on the display device is in a corresponding area of the presentation image. Thus, the user gets information about what a detail image is depicting and could then choose if he wants to see this in larger magnification.

According to a preferred embodiment, the preselected areas are arbitrarily orientated in the presentation image. This implies that the detail image is not restricted to a certain orientation. An object in the image that is to be presented in higher resolution can then be fitted to fill the detail image as much as possible.

Preferably, the continuous zooming in the presentation image includes a simultaneous rotation of the presentation image to fit the orientation of the preselected area into the window. The zooming in on the detail image is then performed in the same window and the presented image will always be in this window. The rotation implies that a user will be guided to the view of the detail image from another angle. Also, the zooming is performed continuously and the change in viewing angle is achieved smoothly during the zooming.

The objects of the invention are also achieved by a method for generating an image for electronic presentation. The method comprises the steps of determining a main image that the presentation is to be based on and generating a presentation image from the main image by compressing and reducing the information in the main image. The method further comprises the steps of selecting areas in the main image that are to be presentable in a higher resolution than corresponding areas in the presentation image and generating detail image information data sets for the selected areas from the main image. The detail image information data sets are used for presenting the preselected areas in higher resolution than corresponding areas in the presentation image. The method further comprises the step of associating the detail image information data sets with the corresponding areas in the presentation image to enable a load of one detail image information data set simultaneously with a continuous zooming in on the corresponding area of the presentation image.

In this way, several small image information data sets are generated, and each small image information data set is loaded separately. This means that only a small amount of data has to be loaded at a time, as the presentation image and the detail image information data sets are small. The loading time is then shortened and thanks to the simultaneous zooming in the presentation image, when a detail image is loaded, a user does not notice this loading time, or notices only a very short delay. The compressing and reducing of information in the main image to generate the presentation image is performed to get a presentation image requiring sufficiently small memory. Information that is not needed could then be cut off and not included in the presentation image. Thus, the smallest details might not be discerned in the presentation image. Furthermore, only information about the selected area is needed in each detail image information data set, which implies that these data sets can be very small.

Preferably, the step of generating a detail image information data set comprises the step of generating a detail image for the selected area from the main image, wherein the detail image represents the selected area in higher resolution than the corresponding area in the presentation image.

Thus, a detail image is generated before the presentation of the selected area in high resolution. This implies that the detail image could be processed in beforehand and thus be compressed and the image quality could be enhanced.

In a preferred embodiment, the step of generating a detail image information data set further comprises the step of zooming in on the corresponding area in the presentation image to the selected area. The step of generating a detail image information data set further comprises the steps of computing the difference between the zoomed-in-on, corresponding area in the presentation image and the detail image to generate a difference image and storing the difference image in the detail image information data set. As a result, the detail image information data set could be very small. The difference image could be heavily compressed, since it holds the differences between two very similar images and thus many values are zero or close to zero. This implies that small memory space is required and the detail image information data set could be loaded quickly.

In another embodiment, the step of generating a detail image information data set further comprises the step of storing the detail image in the detail image information data set. Thereby, the generating of the detail image information data set is fast and no processing is needed for presentation of the detail image when the detail image information data set has been loaded.

Preferably, the generated presentation image and the generated detail images are of the same size. As a result, the presentation image and the detail images could be displayed in a window of unchanged size. Thus, the presentation of the image will not affect other objects presented around the image.

In a preferred embodiment, the selected areas are arbitrarily orientated in the main image. As a result, this could be used to fit the object in the detail image so that it fills the detail image as much as possible, and thus could be shown in highest magnification.

Preferably, the method further comprises the step of rotating the detail images so that they are oriented in the same way as the presentation image. This implies that an object that is inclined in the presentation image could be presented in a raised orientation when the detail image is presented.

In a preferred embodiment, the method further comprises the step of selecting a subarea within a selected area in the main image. The subarea is to be presentable in a higher resolution than the corresponding subarea in the selected area. The method further comprises the steps of extracting information from the subarea in the main image to generate a detail image of the subarea, and associating the detail image of the subarea with the corresponding area in the detail image of the selected area. Thereby, zooming in several steps is enabled.

In another preferred embodiment, the method further comprises the steps of determining an additional main image of a selected area in the original main image depicting the selected area in higher resolution than the main image, and compressing the additional main image to generate a detail image. When an object in the original main image is shown in low resolution, an additional main image depicting this object in higher resolution could be used to allow a user to get a better view of the object. Then further zooming in on this object could also be achieved.

In yet another preferred embodiment, the step of generating a detail image comprises the step of transforming a view in a first perspective of an object in the selected area into a view in a second perspective of the object. This implies that the perspective of the detail image could be transformed so that an object in the detail image is presented as if it were placed in a plane of the image. The transformation could take care of distortions occurring when the object has parts that are positioned at different distances from a camera capturing the main image.

Preferably, a corresponding area showing an object in a first perspective is replaceable, during presentation, by a detail image generated from an additional main image that shows the object in a second perspective. Thereby, the object could really be depicted in the second perspective. This additional main image could also be used to create detail images of subareas in order to enable zooming of parts of the object.

BRIEF DESCRIPTION OF THE DRAWINGS

The present invention will now be described in more detail by way of example referring to the appended drawings.

DETAILED DESCRIPTION OF A PREFERRED EMBODIMENT OF THE INVENTION

Figure 1:
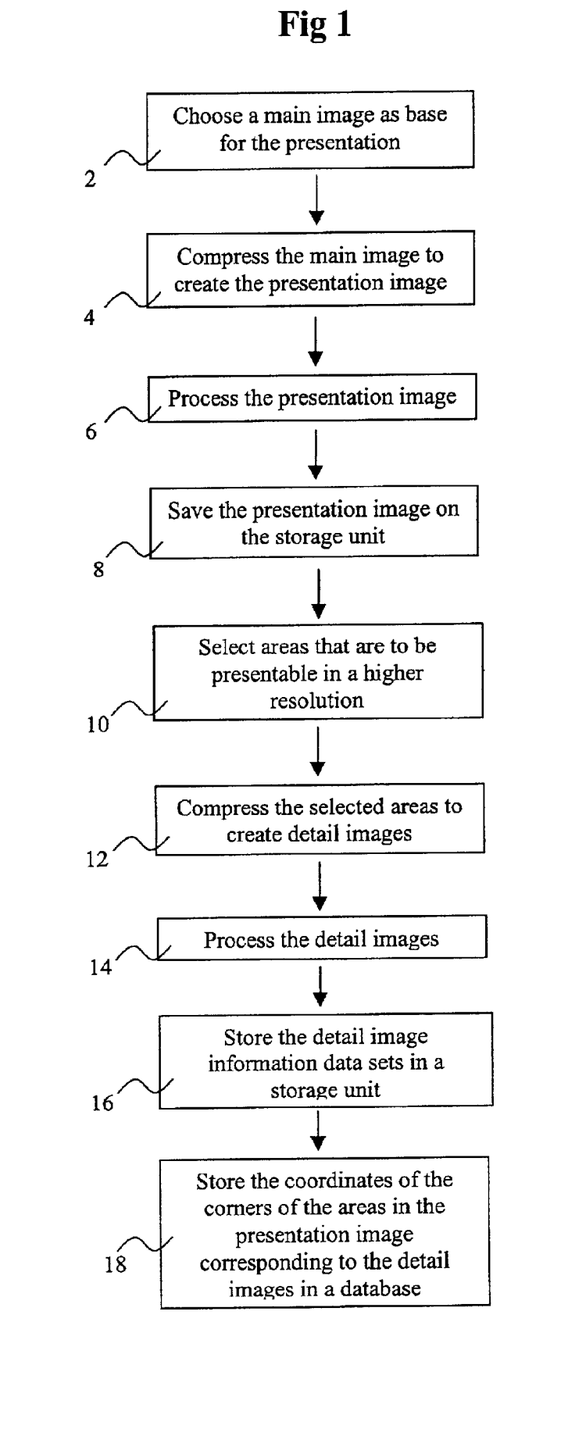
FIG. 1 is a flowchart showing a method of preparation of an image for presentation.

Referring to FIG. 1, a method for preparing an image for electronic presentation will be described. This preparation could be performed by, for example, a designer of a web page that is to comprise images, or a designer of software that will present images. According to the invention, the designer uses software that automatically generates associations between images and connections to a web site, when the designer selects the images.

First, a main image that the presentation is to be based on is chosen, step 2. Preferably, the main image is of high resolution and/or of a large size, thus containing a large amount of information. The main image is then compressed and reduced in size to create a presentation image, step 4. The presentation image is the image that is to be presented electronically and is of a relatively small size containing a small amount of data. Thus, the presentation image requires small memory space and can be loaded quickly.

Next, the presentation image is processed, step 6, in order to have as high quality as possible while retaining its small amount of data. Thus, filters, such as anti-aliasing filters, could be applied to the presentation image, in order to correct for errors arising during the creation of the presentation image by the compressing of the main image. Thereafter, the presentation image is saved on a storage unit, step 8, from which a display device could load the presentation image for presentation.

Next, areas in the main image, which are to be presentable in higher resolution than in the presentation image, are selected, step 10. The selected areas are compressed and reduced to create detail images, step 12.

Preferably, the detail image is of the same size as the presentation image. Thereby, the detail image takes up an equally large area as the presentation image when presented. Therefore, the selected area in the main image preferably has the same proportions as the main image itself, whereby the detail image could be of the same size as the presentation image without requiring distortion of the selected area. If a selected area in the main image is smaller than the presentation image, the selected area has to be enlarged during the creation of the detail image, but the data in the selected area can still be compressed.

The small size and low resolution of the presentation image implies that details in the presentation image are not clearly presented. Therefore, the detail images are created, so that interesting parts of the presentation image could be presented in a higher resolution. As for the presentation image, the detail images are processed, step 14, to obtain as high quality as possible while retaining a small amount of data of the detail image. The image processing needed for the detail image could be more extensive if the selected area has been enlarged for creation of the detail image. The image processing could then e.g. have to include more smoothening of the image.

The detail images could be used for direct presentation on a display device. Then each detail image is stored in a detail image information data set that is loaded when the detail image is to be presented.

In an alternative embodiment, the corresponding area in the presentation image to the selected area is zoomed in on to present the corresponding area in the same size as the detail image. Next, a difference between the detail image and the zoomed-in-on, corresponding area in the presentation image is computed and stored in a difference image. The difference is computed by subtracting each pixel value in the detail image from the corresponding pixel values in the zoomed-in-on, corresponding area and storing the differences in corresponding elements of a matrix of the difference image.

The difference image that has been generated is a matrix with values between −255 and 255, if each pixel value is stored in a byte. Very few absolute values in the difference image are larger than 127. Therefore, these values are set to −128 if they are negative and +127 if they are positive. Alternatively, the first bit could be stripped off, which will automatically transfer all values between −255 and 255 to be between −127 and 127. Next, 128 is added to all values in the matrix, so that it will contain values between 0 and 255 as in images. The difference image is then compressed with an image compression algorithm.

The difference image could be compressed even further by stripping off more bits or setting a lower threshold of the highest absolute value. Thus, all absolute values larger than, for example 63, could be set to −64 if they are negative and to 63 if they are positive. Alternatively, the least significant bits could be stripped off. For example, the bits could be shifted three steps to the right so that the three least significant bits are ignored. These bits hold the least information as they represent the lowest values and therefore there is no great loss of information when they are skipped.

The detail image is of higher resolution and sharper, and thus edges and contours will generate the largest differences in the difference image. However, the detail image and the zoomed-in-on, corresponding area in the presentation image are very similar and most of the difference values will be zero. Therefore, the difference image could be heavily compressed and will require very small memory space and loading time. The zoomed-in-on, corresponding area in the presentation image could be smoothed to reduce the differences between the images and enable the difference image to be even smaller. The difference image is stored in a detail image information data set.

Next, the detail image information data sets are stored, step 16, in the storage unit. The detail image information data sets are associated with corresponding areas in the presentation image so that when such a corresponding area in the presentation image receives a command during presentation, the detail image information data set responding to that area is loaded. Coordinates of the corners of the areas in the presentation image that correspond to the detail images are stored, step 18, in a database. Each corner of the corresponding area is associated with a corner of the presentation image, thus defining the orientation that the corresponding area will have when it is zoomed in on during presentation. Alternatively, the coordinates of one corner of the corresponding area is stored in the database. In addition the height, width and inclination angle of the area could be stored.

Meta data that are associated with images are also stored in the database. This meta data could then be shown or activated when an image is presented or a corresponding area in the presentation image is activated, e.g. by a marker being brought therein. The meta data could also be associated with a certain area of any form, a hot spot, in an image and thus be presented when this area is activated. Thus, the meta data could be e.g. some text describing or giving facts about the contents of the image, or a sound file or a video file that is played when presenting the image. Further, the meta data could comprise search criteria, such as words describing what an image depicts. This could be used during presentation in such a way that if a user enters a search word, the image associated with this word through the meta data is selected for presentation.

Further areas in the main image could be selected within the previously selected areas. Detail images of these selected areas could then be created in the same manner as described above, and these detail images are then associated with corresponding areas in the previously created detail images. Thus, a tree for the presentation of the images is created, where the presentation image is the stem and the detail images are branched in several steps off the stem.

Alternatively, an extra image captured in higher resolution of a part of the main image could be used for enabling further zooming in the presentation. The extra image is then processed in the same way as the main image to generate a detail image. This detail image is in the same way as above associated with a corresponding area in the presentation image. However, the quality of this detail image could be higher compared to a detail image generated from the main image.

Figure 2:
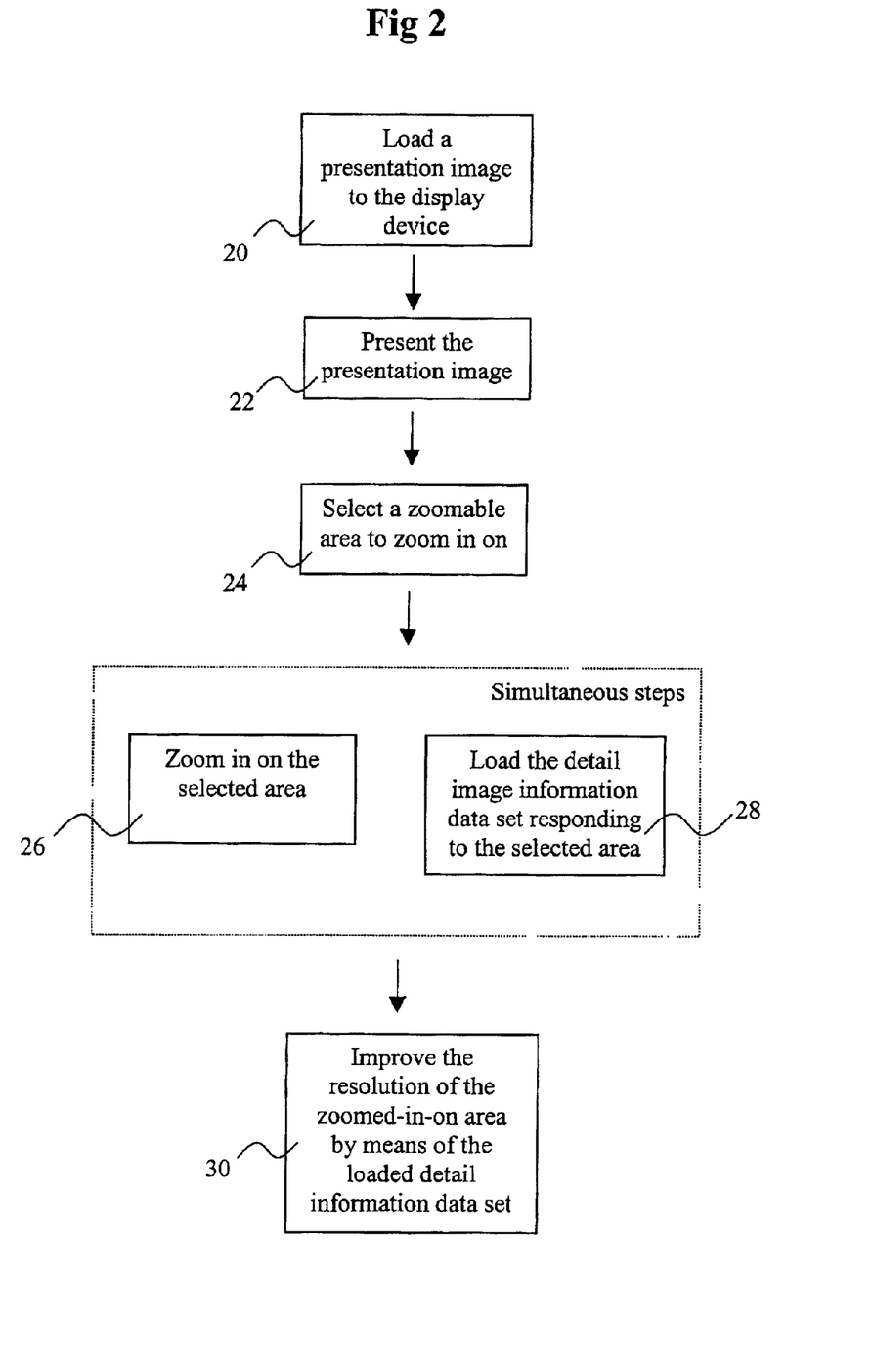
FIG. 2 is a flowchart showing a method of zooming in an image.

The presentation image and the detail images are now prepared for presentation. Referring to FIG. 2, a method according to the invention for zooming in an image will be described in detail. A presentation image stored in a storage unit is loaded to a display device, step 20. The loading time of the presentation image will be short due to the small size of the presentation image. When the presentation image has been loaded, the display device presents the presentation image, step 22, in a presentation window. The presentation image is stored in a cache memory connected to the display device so that it could be retrieved in a very fast manner during the presentation. The presentation image comprises zoomable areas that have been selected and prepared for zooming in accordance with the method described with reference to FIG. 1. The corner coordinates of the zoomable areas, which are stored in a database on the storage unit, could be used to draw frames indicating the corresponding areas in the presentation image, when it is presented.

A zoom in a presentation image could be initiated by a click in a zoomable area in the presentation image. However, the zoom could also be initiated by moving a cursor on the display device into the zoomable area. The zoom could also be initiated by activating a displayed key word or information text that corresponds to a zoomable area.

When a zoomable area is selected to be zoomed in on, step 24, the following routine is initiated. A continuous zoom is performed in the presentation image into the selected area, step 26, and simultaneously a detail image information data set corresponding to the selected area is loaded from the storage unit, step 28. Thus, a zooming is performed during the loading of the detail image information data set and a user does not experience any waiting time when the detail image information data set is loading, as the zooming in the presentation image is performed at that time. When the zooming in on the selected area and the loading of the detail image information data set are complete, the resolution of the zoomed-in-on, selected area is improved by means of the loaded detail image information data set, step 30. The zoomed-in-on, selected area of the presentation image is also stored in the cache memory.

Alternatively, the detail image information data set comprises a difference image. The detail image information data set is then loaded very quickly. When, the difference image has been loaded, 128 is subtracted from all pixel values in the difference image to account for the adding of 128 that was done when the difference image was created. If other operations have been performed on the difference image reverse operations are performed to account for these operations. For example, if the three least significant bits have been stripped off, the bits are shifted three steps to the left to account for this. Thereafter, the average value of the ignored information in the least significant bits is added to all values. Thus, when the three least significant bits have been stripped off, 4 is added to all values.

When the selected area of the presentation image is completely zoomed in on the difference image, on which the reverse operations have been performed, is added to the zoomed-in-on, selected area. The addition is performed pixelwise and the sum is the detail image in higher resolution than the zoomed-in-on area. This requires that the zoomed-in-on, selected area is equal to the zoomed-in-on area that was used to generate the difference image. Thus, if that area was smoothed, the zoomed-in-on, selected area will have to be smoothed in the same way. The detail image can then be presented, thus replacing the zoomed-in-on, selected area and improving its resolution.

The continuous zoom is performed as follows. First, coordinates of corners of the presentation image are determined. Then, coordinates of corners of the area selected to be zoomed in on are determined. During the zoom, the presentation image is replaced by temporary images that are continuously updated and show a gradually smaller part of the presentation image. The corners of the temporary images in the presentation image are linearly moved from the corners of the presentation image to the corners of the selected area.

A calculation speed is measured during the zooming by measuring the time for computation of the last temporary image. The number of steps in the zooming is then adapted to the speed for rendering temporary images. Thereby, the zooming is always equally fast regardless of the calculation speed. The size of each linear step is decided in accordance with the calculation speed. The step size could then be decreased at the end of the zooming, when the calculation speed has been determined. However, any distribution of the step size is possible.

In an alternative embodiment, the coordinates of one corner of the area selected to be zoomed in on is determined. This corner is associated with one corner in the presentation image. During the zooming, the corner of the presentation image is linearly moved towards the corner of the selected area. If the image needs to be rotated during the zooming, the rotation angle is determined. The step size of the rotation angle between two temporary images is determined by a cubic polynomial, which implies that the step size is of different sizes in the beginning and at the end of the zoom. This implies that the rotation angle could be small at the beginning of the zooming and be larger at the end of the zooming. Hereby, a risk that a temporary image would end up partly outside the presentation image is avoided.

When the corners of a temporary image have been decided the pixels of the area defined by the temporary image are expanded to fill the presentation area. Each pixel is compared to its eight adjacent pixels for smoothing the temporary image as it is expanded. In this way, the image is zoomed in on the selected area, which at the end of the zooming fills the whole presentation window. The replacement of a temporary image with a subsequent temporary image is performed so quickly and the steps between two subsequent temporary images are so small that the zooming is experienced to an observer as being continuous. Simultaneously with the zooming, the detail image information data set corresponding to the selected area is loaded from the storage unit. Thus, when the zooming in the presentation image is complete, the zoomed-in-on, selected area is replaced by the detail image, which shows the area in higher resolution and therefore of higher quality.

The zoomed-in-on corresponding area of the presentation image is stored in a cache memory connected to the display device. This implies that a quick zooming out is enabled, where the cached corresponding area replaces the detail image and then zooming out is performed to the presentation image in the same way as for the zooming in.

The zoomable areas in the presentation image could be arbitrarily orientated. The linear movement of the corners from the presentation image to the detail image will automatically take care of a needed rotation of the image to show the selected area in the same orientation as the presentation image. A corner of the selected area could be associated with an arbitrary corner of the presentation image, which would enforce a rotation of the selected area. If the presentation window is rectangular, a selected area could be orientated in two different fashions when filling the presentation window, and if the presentation window is quadratic the selected area could be orientated in four different fashions. The rotation of the image is continuous during the zooming, so the observer is smoothly guided to the new orientation in the image.

Since the selected area is zoomed in on and subsequently fills the presentation window, it is preferred that the selected area and the presentation image have the same proportions. The proportions could be different, but then the selected area could not fill the presentation window without distorting the image.

The zoomable areas are preferably indicated by frames surrounding the areas. This shows which areas in the image can be zoomed in on. The frame will also make an observer curious and this will trig the observer to zoom in on the area. Thus, the designer could make the parts of the image that he wants to show zoomable and the observer will by his own free will zoom in on these parts. In such a way, the designer could tempt the observer to zoom in on a detail image showing an object he wants to sell.

In an alternative embodiment, the selected area could be of a form that accounts for objects being depicted in perspective. If the main image were rectangular, the selected area would in this way be a parallelogram. The image in the parallelogram could then be transformed into a rectangle of the same size as the presentation image. This transformation alters the perspective of the image and a detail image created in this way could thus show a plan view of the object.

Alternatively, the selected area could be divided in two or more sections, wherein the perspective of each section could be transformed independently and differently.

In an alternative embodiment, where detail images are branched in several steps off the stem, an observer could be guided between images. If a specific image is requested by the observer by e.g. a search for a word specified in the meta data, the observer could automatically be guided from the current image, that is the image currently presented to him, to the requested image. The current image, which is presented, is zoomed out from until a common image is displayed. The common image is an image that has both an area corresponding to the requested image and an area corresponding to the current image. Then, the common image is zoomed in on until the requested image is displayed. Thus, the observer has been guided from the image that was presented on the display device to the image that he requested. The guiding could include both zooming out from the current image and zooming in from the common image. However, if the common image equals the requested image, no zooming in is required and if the common image equals the current image, no zooming out is required.

The method for presentation of images described above could be very useful for merchandising a fabric. The fabric is not brought onto an observer against his will, but instead the observer is tempted to zoom in on an area in an image showing the fabric. This temptation is caused by a frame indicating that the area could be zoomed in on, which makes the observer curious and makes him zoom in on the area.

Another application for presentation of images according to the invention is e-learning. If a student is to learn about the human body, it could be presented to him in an image. When the student wants to learn more about e.g. the spleen, the image is zoomed in on to show a detail image presenting the spleen and at the same time meta data holding information about the spleen could be presented. The student will then get an idea of where in the body the spleen is situated, as the zooming in guides him to the area, and he will also get the relevant information presented.

It should be emphasized that the preferred embodiment described herein is in no way limiting and that many alternative embodiments are possible within the scope of protection defined by the appended claims. For example, the detail images and the presentation image do not have to be of the same sizes. The presentation window could then be partially filled when a detail image of smaller size than the presentation image is presented. Hereby, the form of the detail image could also be chosen arbitrarily. Alternatively, the size of the presentation window could increase when a detail image of a larger size than the presentation image is presented.

The continuous zooming could also be performed in alternative ways. For example, the presentation image could be kept intact and form a background to the zooming. The corners of the area that the zoomed-in-on area is to fill and of the area in the presentation image that is selected to be zoomed in on are determined. Temporary images are then generated that show the selected area on an increasing scale. The corners of the temporary images gradually move towards the corners of the area that is to be filled. The temporary images are generated by pixel expansion of the selected area in the presentation image. During the zooming temporary images are continuously replaced and the selected area is thus gradually expanded to cover an increasing area of the presentation image. When the zooming is completed, the detail image representing the selected area in higher resolution is presented.

The area that the selected area is to fill could be of the same size as the presentation image but it could also be smaller. In the latter case, the presentation image is shown in the background when the zooming is complete. Furthermore, the area that is selected to be zoomed in on could have an arbitrary form and still the image contents will not be distorted if the area that the zoomed-in-on area is to fill has the same proportions. Alternatively, the zoomable area could have a simple form, such as a rectangle, but the parts of the area that are outside an object of a complex form could be transparent when the zooming in is performed. Thus, the presentation image in the background is seen behind the transparent part of the zoomed-in-on area.

According to a further alternative, the selected, zoomable area in the presentation image could be entirely or partly beside the area that the zoomed-in-on area fills. The selected, zoomable area is then visible in the presentation image in the background. During the zooming, the temporary images would then be continuously translated towards the area that the zoomed-in-on area is to fill.

In an alternative embodiment, the presentation image could be replaced dynamically by other presentation images showing related information. Thus, if a human body is shown, the presentation image could be replaced by an image where the skin has been peeled off, thus showing the muscles of the body. Alternatively, the side view of an object could be replaced by a front view of the object. The presentation image could be faded into showing the other presentation image. Alternatively, the transition could be performed by scrolling or squeezing.

In a further alternative embodiment, the presentation image could be larger than the presentation window. The observer would then be able to pan in the presentation image and select a zooming in on zoomable areas when shown in the presentation window. The detail image would then fill a part of or the entire presentation window. The presentation image could in this embodiment show a 360° rotation of a camera, that is when a user pans in the image a rotation of the camera that captured the image is simulated. The left and right sides of the presentation image could then be connected to each other so that the presentation image forms a cylinder watched from the inside. In the same manner, all sides of the presentation image could be connected to form a sphere watched from the inside.

What is claimed is:

1. A method for zooming in an image that is being presented on a display device connected to a storage unit, wherein said presentation image is loaded to the display device from said storage unit and said presentation image comprises at least one preselected, zoomable area, said method comprising the steps of:
    continuously zooming in on the preselected area in the presentation image,
    from the start of the step of continuously zooming, simultaneously downloading a detail image information data set from the storage unit, wherein said detail image information data set is used for presenting the preselected area in higher resolution than in the presentation image, and
    improving the resolution of the zoomed-in-on, preselected area in the presentation image on the display device by means of the downloaded detail image information data set when the zooming in on the preselected area in the presentation image is complete.

2. The method according to claim 1, wherein the detail image information data set comprises a difference image, said difference image representing the difference between the zoomed-in-on, preselected area in the presentation image and a detail image representing the zoomed-in-on, preselected area in higher resolution.

3. The method according to claim 2, wherein the step of improving the resolution comprises the steps of adding the difference image to the zoomed-in-on, preselected area in the presentation image to generate said detail image of the zoomed-in-on, preselected area in higher resolution and replacing the zoomed-in-on, preselected area in the presentation image on the display device by the detail image.

4. The method according to claim 1, wherein the detail image information data set comprises a detail image representing the preselected area in higher resolution than the presentation image.

5. The method according to claim 4, wherein the step of improving the resolution comprises the step of replacing the zoomed-in-on, preselected area in the presentation image on the display device with the detail image when the zooming in on the preselected area in the presentation image is complete.

6. The method according to claim 3 or 5, further comprising the step of zooming out from a detail image that is being presented on the display device, said step of zooming out comprising the steps of:
    replacing the detail image on the display device by a corresponding completely zoomed-in-on, preselected area in the presentation image, and
    subsequently continuously zooming out from the corresponding area of the presentation image until the entire presentation image is presented.

7. The method according to claim 1, wherein the presentation image is being presented in a window on the display device and wherein the continuous zooming is performed in said window, whereby the preselected area is expanded or reduced over the presentation image so that the preselected area gradually covers a greater or smaller part of the presentation image.

8. The method according to claim 1, wherein the presentation image is being presented in a window on the display device and wherein the continuous zooming is performed in said window so that a gradually smaller or greater part of the presentation image is shown in the window during the continuous zooming.

9. The method according to claim 7 or 8, wherein the detail image fills the window when replacing the zoomed-in-on, preselected area in the presentation image.

10. The method according to claim 1, wherein the boundaries of the preselected, zoomable areas in the presentation image are indicated in the presentation image to highlight the preselected, zoomable areas.

11. The method according to claim 3 or 4, wherein a detail image comprises preselected, zoomable areas and zooming in on one of these preselected areas is performed in the same manner as for the presentation image.

12. The method according to claim 3, wherein meta data is associated with at least one of the presentation image and the detail images.

13. The method according to claim 4, wherein meta data is associated with at least one of the presentation image and the detail images.

14. The method according to claim 12 or 13, wherein the meta data comprises search criteria to enable a user to search for a specific detail image.

15. The method according to claim 14, wherein a search results in a pointer to a requested detail image and a step of presenting the requested detail image comprises the steps of:
    determining a current image, which is the image that is currently presented on the display device,
    determining a common image for the current image and the requested image, which is the image of largest scale that includes both an area corresponding to the current image and an area corresponding to the requested image,
    zooming out from the current image to the common image, and
    zooming in from the common image to the requested image.

16. The method according to claim 12 or 13, wherein the meta data associated with an image is shown when the image is presented on the display device.

17. The method according to claim 12 or 13, wherein the meta data associated with a detail image is shown when a marker on the display device is in a corresponding area of the presentation image.

18. The method according to claim 1, wherein the preselected areas are arbitrarily orientated in the presentation image.

19. The method according to claim 18, wherein the continuous zooming in the presentation image includes a simultaneous rotation of the presentation image to fit the orientation of the preselected area into the window.

20. A method for generating an image for electronic presentation, comprising the steps of:
    determining a main image that the presentation is to be based on,
    generating a presentation image from the main image by compressing and reducing the information in the main image,
    selecting areas in the main image that are to be presentable in a higher resolution than corresponding areas in the presentation image,
    generating detail image information data sets for the selected areas from the main image, wherein the detail image information data sets are used for presenting the preselected areas in higher resolution than corresponding areas in the presentation image, and
    associating the detail image information data sets with the corresponding areas in the presentation image to enable a download of one detail image information data set simultaneously with the start of continuous zooming in on the corresponding area of the presentation image.

21. The method according to claim 20, wherein the step of generating detail image information data set comprises the step of generating a detail image for the selected area from the main image, wherein the detail image represents the selected area in higher resolution than the corresponding area in the presentation image.

22. The method according to claim 21, wherein the step of generating detail image information data set further comprises the steps of zooming in on the corresponding area in the presentation image to the selected area, computing the difference between the zoomed-in-on, corresponding area in the presentation image and the detail image to generate a difference image and storing the difference image in the detail image information data set.

23. The method according to claim 21, wherein the step of generating detail image information data set further comprises the step of storing the detail image in the detail image information data set.

24. The method according to claim 21, wherein the generated presentation image and the generated detail images are of the same size.

25. The method according to claim 20, wherein the selected areas are arbitrarily orientated in the main image.

26. The method according to claim 25, further comprising the step of rotating the detail images so that the detail images are oriented in the same way as the presentation image.

27. The method according to claim 21, further comprising the steps of:
    selecting a subarea within a selected area in the main image, wherein the subarea is to be presentable in a higher resolution than the corresponding subarea in the selected area,
    extracting information from the subarea in the main image to generate a detail image of the subarea, and
    associating the detail image of the subarea with the corresponding area in the detail image of the selected area.

28. The method according to claim 21, further comprising the steps of:
    determining an additional main image of a selected area in the original main image depicting the selected area in higher resolution than the main image, and
    compressing the additional main image to generate a detail image.

29. The method according to claim 21, wherein meta data is associated with at least one of the presentation image and the detail images.

30. The method according to claim 29, wherein the meta data includes search criteria to enable a search for a specific image, the specific image being presented as a result of the search.

31. The method according to claim 21, wherein the step of generating a detail image comprises the step of transforming a view in a first perspective of an object in the selected area into a view in a second perspective of the object.

32. The method according to claim 21, wherein a corresponding area showing an object in a first perspective is replaceable, during presentation, by a detail image generated from an additional main image that shows the object in a second perspective.

* * * * *